United States Patent
Mood

(10) Patent No.: US 11,631,971 B2
(45) Date of Patent: Apr. 18, 2023

(54) CABLE GLAND FOR ARMORED ELECTRICAL OR FIBER OPTIC CABLES

(71) Applicant: CCG INTERNATIONAL HOLDINGS LIMITED, St Peter Port (GG)

(72) Inventor: Geoffrey Ingles Mood, Whitley Bay (GB)

(73) Assignee: CCG INTERNATIONAL HOLDINGS LIMITED, St Peter Port (GG)

( * ) Notice: Subject to any disclaimer, the term of this patent is extended or adjusted under 35 U.S.C. 154(b) by 0 days.

(21) Appl. No.: 17/073,810

(22) Filed: Oct. 19, 2020

(65) Prior Publication Data
US 2022/0123541 A1    Apr. 21, 2022

(51) Int. Cl.
*H02G 15/04*    (2006.01)
*H02G 3/06*    (2006.01)

(52) U.S. Cl.
CPC ......... *H02G 15/046* (2013.01); *H02G 3/0666* (2013.01)

(58) Field of Classification Search
CPC ............................ H02G 3/0666; H02G 15/046
See application file for complete search history.

(56) References Cited

U.S. PATENT DOCUMENTS

| | | | |
|---|---|---|---|
| 2,355,403 A | | 8/1944 | Tripp |
| 2,716,150 A | * | 8/1955 | Matthysse ............ H02G 3/0616 174/152 R |
| 4,515,991 A | * | 5/1985 | Hutchison .............. H02G 15/04 29/858 |
| 4,654,241 A | * | 3/1987 | Vallauri ............... H02G 15/184 29/854 |

(Continued)

FOREIGN PATENT DOCUMENTS

| | | | |
|---|---|---|---|
| GB | 1437338 A | * 5/1976 | ............ H02G 15/04 |
| GB | 1437338 A | 5/1976 | |

(Continued)

OTHER PUBLICATIONS

Combined Search and Examination Report for co-pending Great Britain Application No. 2016528.8, dated Dec. 11, 2020, (3 pages total).

(Continued)

*Primary Examiner* — Timothy J Thompson
*Assistant Examiner* — Rhadames Alonzo Miller
(74) *Attorney, Agent, or Firm* — Leydig, Voit & Mayer, Ltd.

(57) ABSTRACT

A cable gland is provided which has an elongate body having an entrance end and a fitting end with a passage extending therebetween. A locating member having a flange which operatively abuts the entrance end of the body is provided. A clamping assembly is securable to the entrance end of the body through a coupler, and includes a tubular (Continued)

member having a clamping end and a free end with a bore extending between them. The clamping end provides a clamping surface complementary to the flange of the locating member such that cable armour can be secured between the clamping surface and the flange, both of which extend in a radial direction, generally normal to the axes of the passage and the bore.

13 Claims, 9 Drawing Sheets

(56) References Cited

U.S. PATENT DOCUMENTS

| | | | | |
|---|---|---|---|---|
| 5,230,640 A * | 7/1993 | Tardif | | H01R 13/53 174/88 C |
| 5,502,279 A * | 3/1996 | Mirebeau | | H02G 15/103 174/73.1 |
| 5,691,505 A * | 11/1997 | Norris | | H02G 15/04 439/98 |
| 6,537,104 B1 * | 3/2003 | Hagmann | | H02G 3/0666 439/461 |
| 6,809,263 B2 * | 10/2004 | Jackson | | H02G 3/065 174/651 |
| 6,812,406 B2 * | 11/2004 | Hand | | H02G 3/0666 174/667 |
| 7,563,993 B2 * | 7/2009 | Drotleff | | H02G 15/007 174/653 |
| 7,749,021 B2 * | 7/2010 | Brodeur | | H01R 13/59 174/359 |
| 7,781,685 B2 * | 8/2010 | Bartholoma | | H02G 15/04 174/654 |
| 9,935,443 B2 * | 4/2018 | Mood | | H01R 9/053 |
| 2018/0301885 A1 * | 10/2018 | Jackson | | F16L 5/02 |

FOREIGN PATENT DOCUMENTS

| | | | | |
|---|---|---|---|---|
| GB | 2138220 A | * | 10/1984 | ......... H02G 3/0666 |
| GB | 2138220 A | | 10/1984 | |
| GB | 2269060 A | | 1/1994 | |

OTHER PUBLICATIONS

Search Report for co-pending Great Britain Application No. 2016528. 8, dated Dec. 10, 2020, (1 page total).

* cited by examiner

CABLE GLAND FOR ARMORED ELECTRICAL OR FIBER OPTIC CABLES

FIELD

This application relates to a cable gland, more particularly, but not exclusively, to a cable gland for use with armoured electrical or fibre optic cables which need to be connected to their terminations before the cable gland can be installed.

Armouring is used herein in a broad sense and includes a layer in the form of longitudinally extending relatively stiff wires of significant thickness between the inner and outer insulating sheaths of a cable; armouring in the form of fine, substantially more flexible, optionally braided, wires; and metal tape. The armouring may serve one or more functions including, but not limited to, physically protecting or reinforcing the cable; providing an electrically conductive earth; and providing an electromagnetic shield.

BACKGROUND

Cable glands for unarmoured cables can have one or two seals which act on the outer sheath of the cable and this type of cable gland typically has an essentially constant bore throughout its length as the cable passes through the gland unchanged. Cable glands for armoured cables do not normally have a constant bore through them. This is because when armoured cables are used in an electrical installation, it is usually necessary to terminate the armour within the cable gland and this necessitates stripping away parts of the cable. The prepared cable will therefore have different diameters (the inner bedding, the armour and the outer sheath) and the cable gland has a different diameter at each of its parts corresponding to those cable diameters.

Normally when connecting an armoured cable to a piece of electrical equipment the cable is prepared by stripping away a section of the outer sheath, the armour and the inner bedding exposing cable cores of sufficient length to make the electrical connection within the equipment. The cable gland is then connected to the equipment and the cable is secured by the cable gland. Finally, the cable cores are connected to terminals inside the equipment. It is not unusual for the cable to be turned slightly as the cable gland is tightened, but as the cable cores are trimmed and connected after this they are not twisted or strained by this action.

In certain applications, such as when connecting an electrical cable or a fibre optic cable to a plug connector, it is necessary to connect the cable cores first. The cores then have to be kept as straight as possible (particularly if they are made up of optical fibres which can be compromised or damaged if they are not kept straight) and the cable gland is then secured to the cable. This procedure is almost a reverse of the normal installation method. This presents several problems. The first is that the cable gland must be able to slide along the cable beyond its normal installation point. This will only be possible if the cable is at the bottom end of the range of sizes that the cable gland can accommodate. Otherwise the smallest bore of the cable gland will be too small to pass over the outer sheath of the cable.

The second problem is that the armour is usually clamped by two tapered faces, one of which is a cone with a bore through which the cable bedding is passed. If the cable gland components are slid up the cable, when they are moved back to their correct position the armour, which should be clamped to the outside of the cone, will be sitting inside the bore of the cone. Even if it can be manipulated into its correct position on the outside of the cone there is a further issue. When a cable armour is clamped between two tapered faces the action of clamping the two faces together tends to drag the armour up the cone and so push the cable cores into the equipment a small amount. If it is essential that the cores are kept straight, then this can be detrimental.

Finally, if the cable gland is a barrier type gland then it will be difficult to fit the barrier material into the gland as it is normally installed when the gland is secured to the cable, prior to fitting it to the equipment. If the cable gland is fitted to the equipment after the cable is installed, then there will not be access to install the barrier material.

The preceding discussion of the background section is intended only to facilitate an understanding of the present application. It should be appreciated that the discussion is not an acknowledgment or admission that any of the material referred to was part of the common general knowledge in the art as at the priority date of the application.

SUMMARY

There is provided a cable gland comprising an elongate body having an entrance end and a fitting end with a passage extending therebetween, with a locating member having a flange which operatively abuts the entrance end of the body, and a clamping assembly securable to the entrance end of the body through a coupler, the assembly including a tubular member having a clamping end and a sealing end with a bore extending between them, the clamping end providing a clamping surface complementary to the flange of the locating member such that cable armour can be secured between them.

The flange operatively abuts the entrance end of the body and provides the face against which the clamping surface operatively abuts. The face may be provided by the flange of the locating member and the locating member may be integral with the body. The flange and clamping surface may extend in a generally normal radial direction to the axes of the passage and bore. This may prevent armour captured between the surfaces being drawn upwardly or in a longitudinal direction and causing longitudinal movement of the cable. The locating member may have a tubular portion which extends centrally from the flange and operatively into the passage of the body.

A sleeve may be slidably located in the passage and may be securable therein by the locating member.

This may enable the sleeve to receive an inner core of the cable, which inner core may be secured in place using resin, epoxy or a similar settable material.

A compression seal for sealing onto the outer sheath of a cable may be provided at the sealing end of the tubular member; with a nut which is operable to compress an elastomeric member within the tubular member; for the bore to be diametrically enlarged at the sealing end to receive the elastomeric member therein; and for the nut to have an externally screw threaded portion which cooperates with an internally screw threaded portion on the sealing end of the tubular member.

The coupler may be carried on the tubular member; the coupler may be screw threaded for securing to complementary external screw threading on the entrance end of the body and may be shaped to fit over the flange of the locating member; the coupler may be held captive on the tubular member by an elastomeric ring encircling the tubular member near the clamping end.

The locating member may have an internally screw threaded portion which operatively engages an externally screw threaded portion on the sleeve; the flange of the locating member may be of smaller diameter than the entrance end of the body so that the coupler can secure to the entrance end over the flange; the passage may be radially outwardly stepped at the entrance end to receive part of the locating member when secured to the sleeve.

An internal screw thread may be provided on a tubular portion of the locating member which extends centrally from the flange and operatively into the passage of the body, and the passage may be outwardly stepped to receive such tubular portion.

An O-ring may be fitted over the sleeve end of the locating member to provide a seal within the passage or retaining components on the sleeve end.

The internal diameter sleeve may be substantially the same as that of the clamping assembly bore.

The diameter may be selected to permit an armoured cable to be inserted therein. This may enable all the components of the cable gland to be inserted over the cable and moved into place as desired during assembly.

The fitting end of the body may be configured to receive a fitting thereon, preferably through screw threading. The fitting may receive individual cable cores of the armoured cable, and may include plug pins or the like.

Embodiments of the application will now be described, by way of example only, with reference to the accompanying drawings.

DETAILED DESCRIPTION

Figure 1:
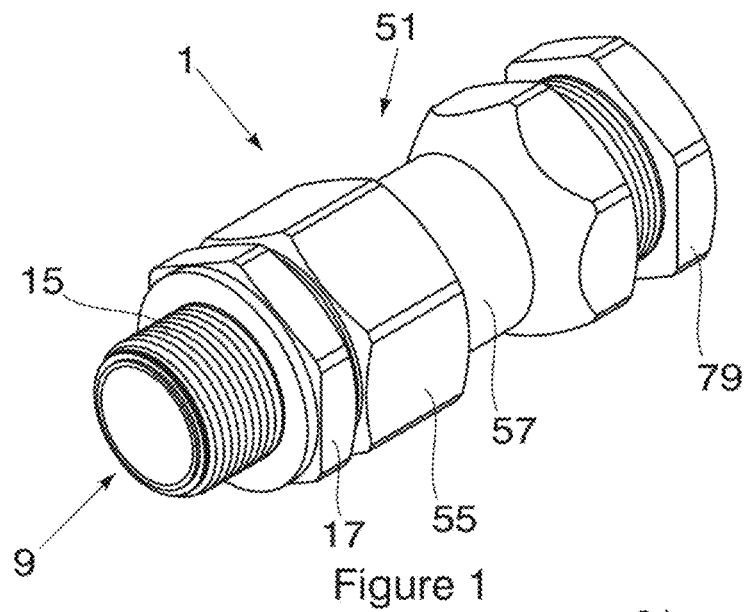
FIG. 1 is a three-dimensional view of one embodiment of a cable gland.
Figure 2:
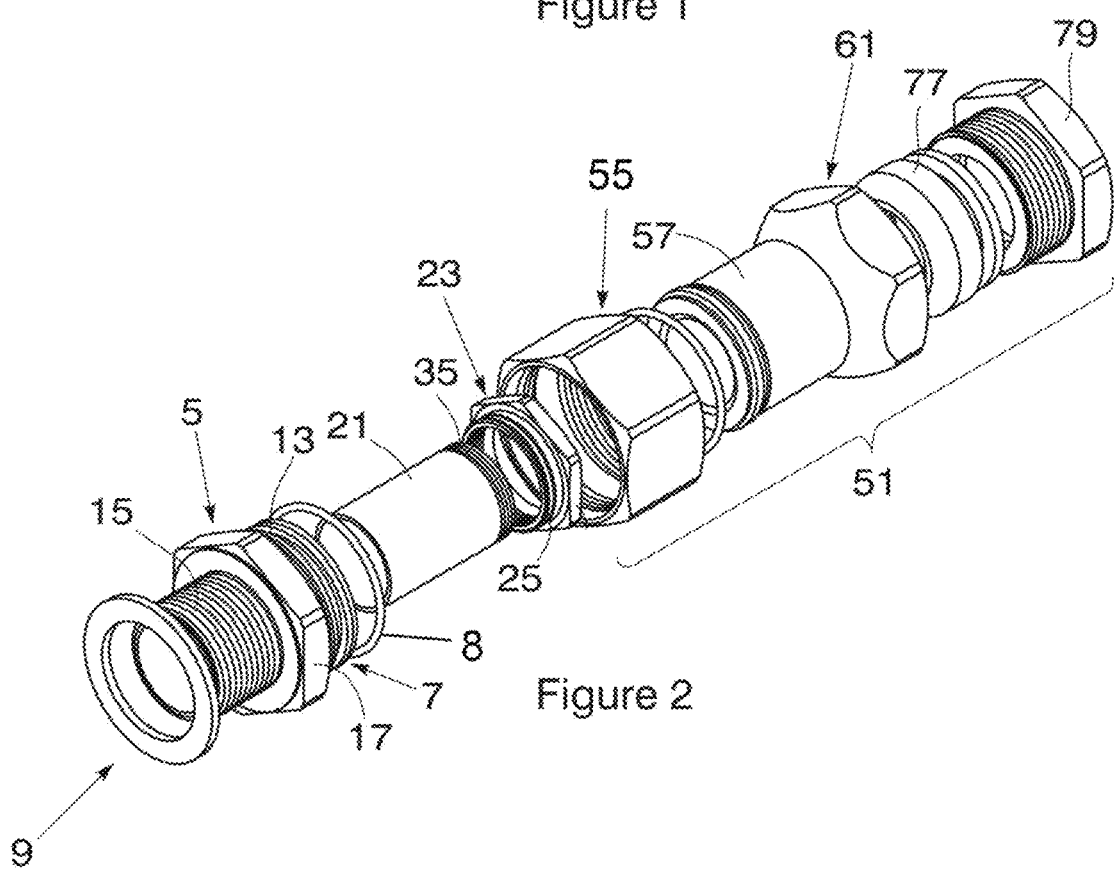
FIG. 2 is an exploded three-dimensional view of the cable gland in FIG. 1.
Figure 3:
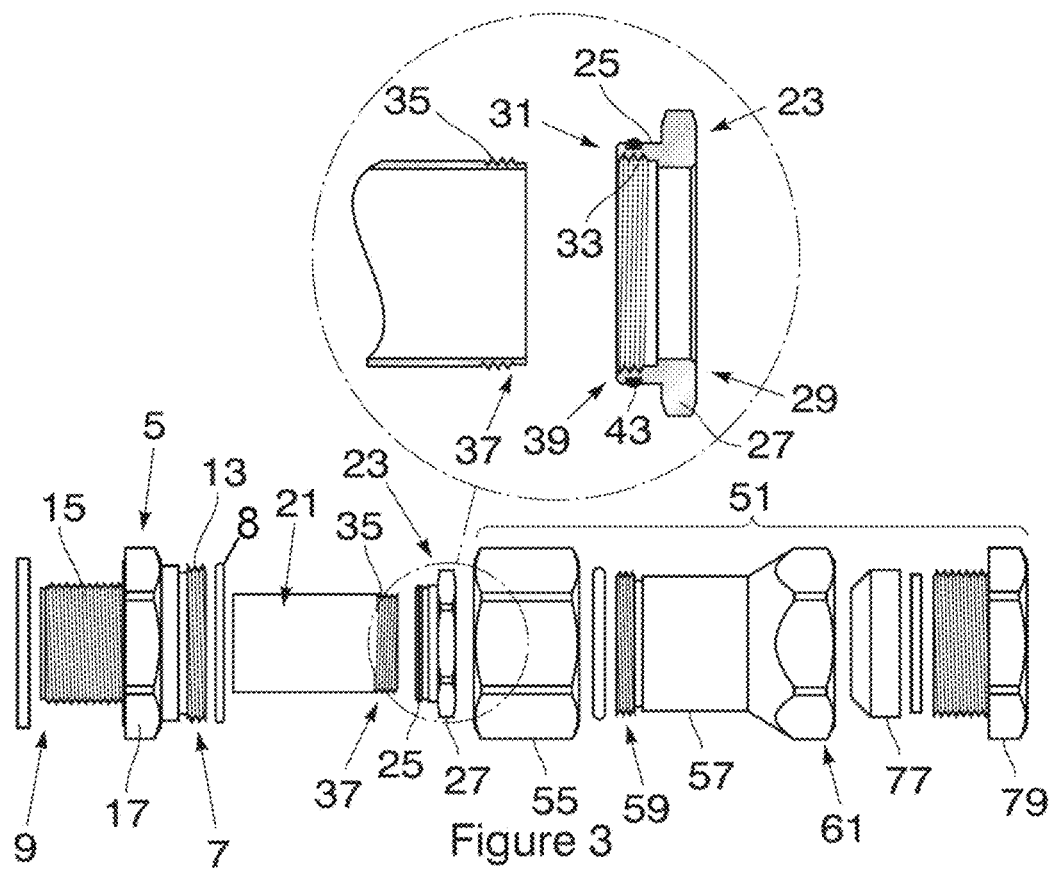
FIG. 3 is an exploded side elevation of the cable gland in FIG. 1.
Figure 4:
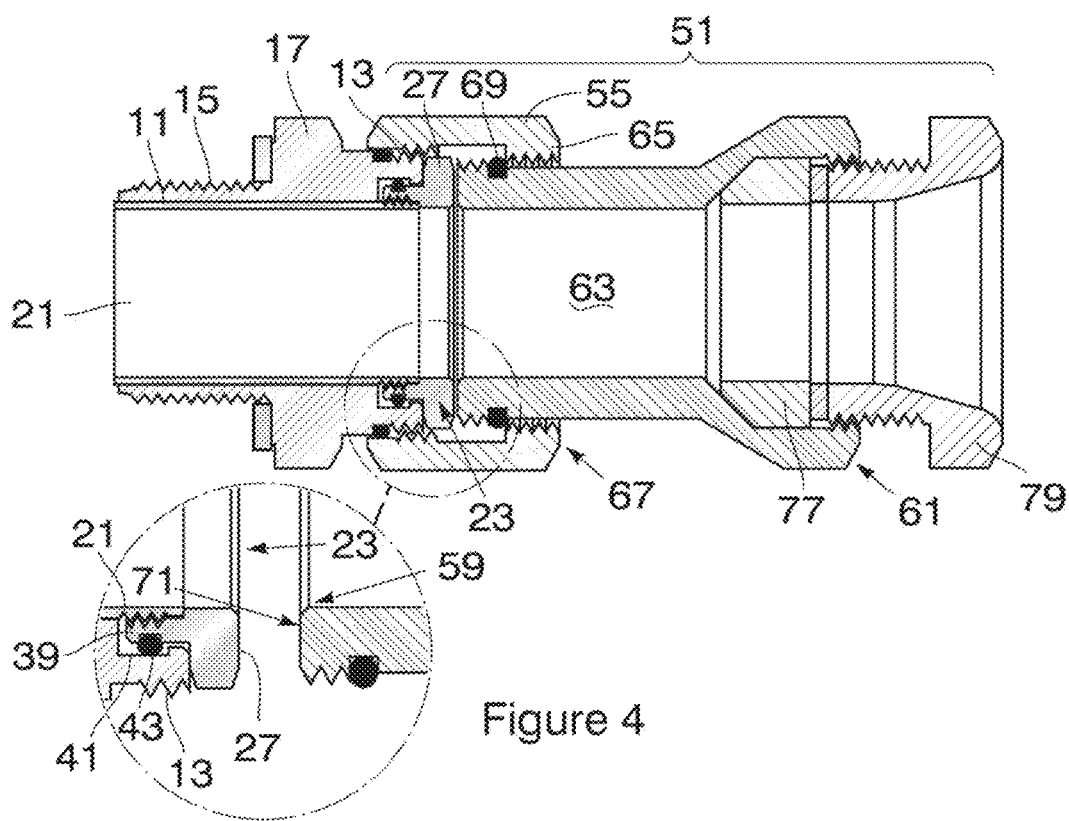
FIG. 4 is a sectional side elevation of the cable gland in FIG. 1.
Figure 5:
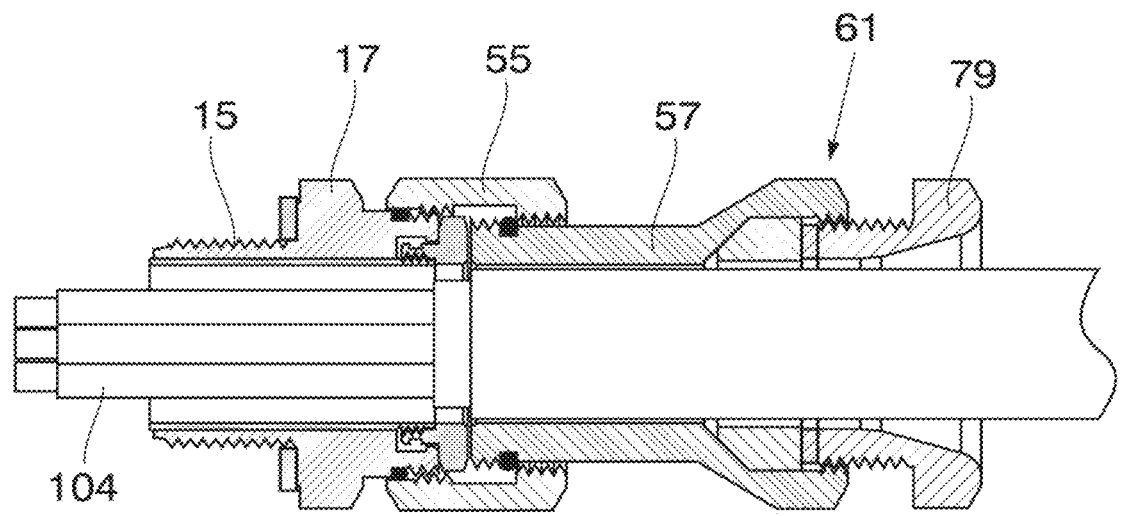
FIG. 5 is a sectional side elevation of the cable gland in FIG. 1 in use with an armoured cable.
Figure 6:
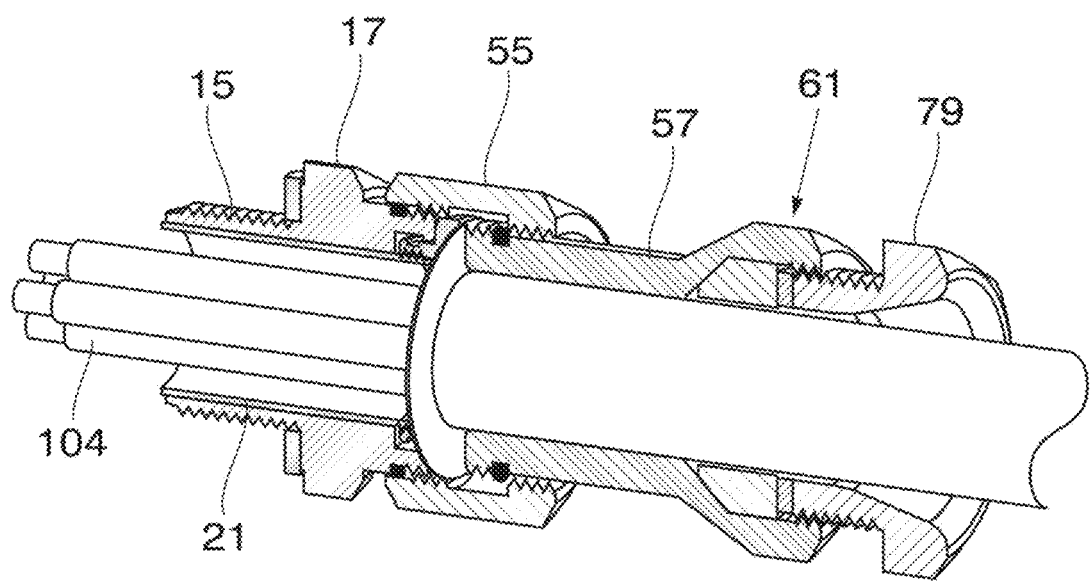
FIG. 6 is a three-dimensional view of the cable gland in FIG. 5.

A cable gland for an armoured cable is provided which includes an elongate body having an entrance end and a fitting end with a passage extending therebetween. Both the ends may be screw threaded, preferably externally, and flats, including in a hex arrangement, may be provided centrally on the body to provide a grip for a spanner.

A sleeve may be slidably located in the passage. The sleeve may be secured or located in the passage using a locating member which may have a squat, tubular body with a flange at one end. Internal screw threading may be provided on the locating member for cooperation with complementary, external screw threading on one end of the sleeve. The flange may operatively butt against the entrance end of the body with the remainder of its body extending into the passage, preferably into a radially outwardly stepped section of the passage at the entrance end. An O-ring may be fitted over the sleeve end of the locating member to provide a seal within the passage or as a method of component retention. Any other method of retention, other than an O-ring, may also be used.

The sleeve may be able to receive an inner core of the cable, which may include a number of individual cores or cables. The inner core may be secured in place using resin, epoxy or a similar settable material which can be inserted into the sleeve, for example, using a syringe or by pouring, with the inner core in position.

The sleeve may have a diameter which permits it to slide the outside of the armoured cable.

A clamping assembly may be securable to the entrance end of the body through a coupler. The clamping assembly may include a tubular member having a clamping end and a free or sealing end with a bore extending between them. The clamping end may provide a clamping surface complementary to a face at the entrance end of the body such that cable armour can be captured, and so secured, between them when the assembly is secured to the body. The face may be provided by the flange of the locating member or, if the sleeve is not present, by a flange of a locating member which is integral with the body.

The clamping end may further provide a clamping surface, complementary to the flange of the locating member such that cable armour can be captured, and so secured, between them when the assembly is secured to the body. This arrangement may also secure the locating member, and through it the sleeve, in position in the body.

The flange and clamping surface may extend in a generally normal, or perpendicular, radial direction to the longitudinal axes of the passage and bore. This may prevent armour captured between them being drawn upwardly or in a longitudinal direction and causing longitudinal movement of the cable.

The coupler may be carried on the tubular member and may be screw threaded for securing to complementary external screw threading on the entrance end of the body. The flange of the locating member may be of smaller diameter than the entrance end of the body so that the coupler can secure to the entrance end over the flange. The coupler may thus be shaped to extend or fit over the flange of the locating member when secured to the body.

The coupler may be held captive on the tubular member by an elastomeric ring encircling the tubular member near the clamping end.

A compression seal for sealing onto the outer sheath of a cable may be provided at the free end of the tubular member. The compression seal may be provided by a nut and an elastomeric member within the tubular member, with the nut operable to compress the elastomeric member to cause radial inward expansion in known fashion. The bore may be diametrically enlarged at the sealing end to receive the elastomeric member therein, and the nut may have an externally screw threaded portion which cooperates with an internally screw threaded portion on the sealing end of the tubular member.

The internal diameter of the sleeve may be substantially the same as that of the clamping assembly bore. The diameter may be selected to permit an armoured cable to be inserted therein. This may enable all the components of the cable gland to be inserted over the cable and moved into place as desired during assembly.

The fitting end of the body may be configured to receive a fitting thereon, preferably through screw threading. The fitting may receive individual cable cores of the armoured cable and may include plug pins or the like. The fitting may vary according to the type of armoured cable, its intended purpose and the equipment, appliance or complementary fitting to which it secures.

One embodiment of a gland (1) for an armoured cable (3) is shown in FIGS. 1 to 6 and includes an elongate body (5) having an entrance end (7) and a fitting end (9) with a passage (11) extending therebetween. Both ends (7, 9) are externally screw threaded (13, 15), and flats (17) in a hex arrangement are provided centrally on the body (5), between the threads (13, 15). The flats (17) provide a grip for a spanner or the like.

The fitting end (9) of the body (5) is configured to receive a complementarily threaded fitting thereon, as described in more detail with reference to FIGS. 7 to 21.

A sleeve (21) is provided which is slidable within the passage (11) and can be secured in the passage (11) using a locating member (23). In this embodiment, the locating member (23) has a squat, tubular body (25) with a flange (27) at one end (29). Internal screw threading (33) is provided at the opposite end (31) which operatively engages over complementary, external screw threading (35) on one end (37) of the sleeve (21).

The flange (27) operatively abuts the entrance end (7) of the body (5). The remaining, tubular portion of the body (25) at the sleeve end (39) extends into the passage (11) and is accommodated in a radially outwardly stepped section (41) of the passage (11) at the entrance end (7). An O-ring (43) may be fitted over the sleeve end (39) portion of the locating member (23) to operatively seal against the outwardly stepped section (41) of the passage (11) or for component retention. An O-ring (8) may also be fitted to the entrance end (7) to function as a seal.

The flange (27) has flats in a hex arrangement about its periphery to provide finger or spanner purchase.

The diameter of the flange (27) is less than that of the entrance end (7) of the body (5) to permit the screw threads (13) at that end to be engaged in a normal fashion by a nut or the like.

The gland (1) further includes a clamping assembly (51) which operatively secures to the entrance end (7) of the body (5) through a coupler (55). The clamping assembly (51) includes a tubular member (57) which has a clamping end (59) and a sealing end (61) with a bore (63) extending between them. The coupler (55) is, in this embodiment, an internally screw threaded nut which is captured on the clamping end (59) of the tubular member (57). An inwardly extending lip (65) on the captive end (67) engages an O-ring (69) on the tubular member (57) near the clamping end (59) to prevent its removal from the tubular member (57).

The coupler (55) may be screwed onto the tubular member (57) by the short length of screw on the clamping end (59). Once the coupler (55) has passed the screw portion it is free to slide along the tubular member (57). The assembly process may include screwing the coupler (55) onto the tubular member (57) and sliding it down the tubular part until the thread on the clamping end (59) is exposed. The O-ring is then slid over the threads and located on the tubular member (57). It may then not be possible for the threads on the coupler (55) and the tubular member (57) to re-engage to separate the parts. Alternatives to the O-ring may be used, such as a split ring, but the O-ring has the added benefit of forming a seal at that joint when it is tightened.

The clamping end (59) further provides a clamping surface (71) complementary to the flange (27) of the locating member (23). The flange (27) and clamping surface (71) extend, in this embodiment, in a generally normal, or perpendicular, radial direction to the longitudinal axes of the passage (11) and bore (63).

The nut (55) extends operatively over the flange (27) to engage the screw threads (13) on the entrance end (7) of the body (5) and so secure the clamping assembly (51) to the body (5).

The bore (63) is radially outwardly inclined to a diametrically enlarged section at the sealing end (61). A complementarily shaped seal (77), in this embodiment an annular, elastomeric member, is located within the enlarged section and butts against the inclined surface. An externally screw threaded nut (79) cooperates with internal screw threads at the sealing end (61) of the bore (63) and is operable to compress the seal (77) to cause radial inward expansion in known fashion.

External flats are provided in a hex configuration on the clamping end (61) of the tubular member (57) to provide purchase for a spanner or the like.

The internal diameter of the sleeve (21) is substantially the same as that of the clamping assembly bore (63). The advantage of this will become apparent from the further description that follows.

Fitment of the cable gland (1) to an armoured cable (3) is shown in stepwise fashion in FIGS. 7 to 21. In this embodiment, the cable gland (1) is shown being assembled to an Amphenol type plug connector (100). It will, however, be appreciated that the cable gland (1) can be used with any suitable plug or other equipment, especially those that require the cable cores to be connected first, and particularly if the cable cores then need to be kept straight.

Figure 7:
FIGS. 7-27 illustrate the fitting of a cable gland in FIG. 1 to an armoured cable.

As shown in FIG. 7, the cable (3) is first prepared by stripping back the outer sheath and bedding to expose the cable cores (104) to a length only sufficient to permit plug pins to be fitted to the cable cores (104). The outer sheath (102) is stripped back to a correct length at a later stage.

Figure 8:
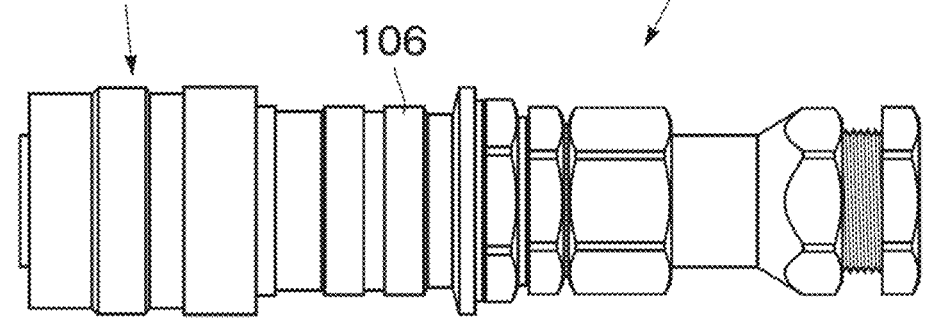

The cable gland (1) and plug (100) are then assembled and connected together, as shown in FIG. 8. In this embodiment, the plug (100) secures to the fitting end (9) of the body (5) through a plug connector (106) which screws over the fitting end (9). It should be ensured that all sealing gaskets are correctly in place during assembly.

Figure 9:
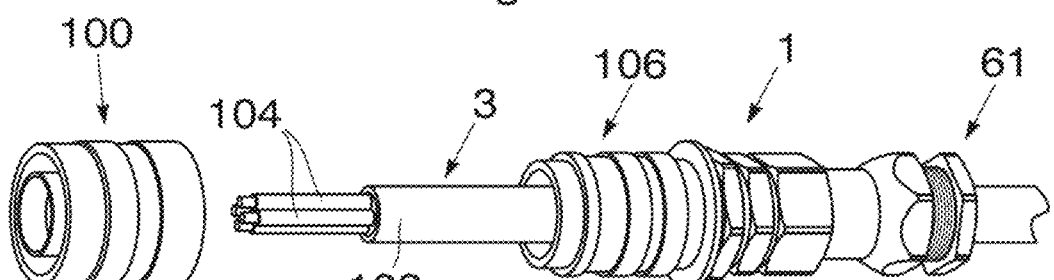

The plug (100) is then disconnected from the plug connector (106) and the cable gland (1) then inserted over the cable (3) from the sealing end (61), as shown in FIG. 9. As the internal diameter of the sleeve (21) is substantially the same as that of the clamping assembly bore (63) the entire cable gland (1) can be slid down the cable (3) over the outer sheath (102).

Figure 10:
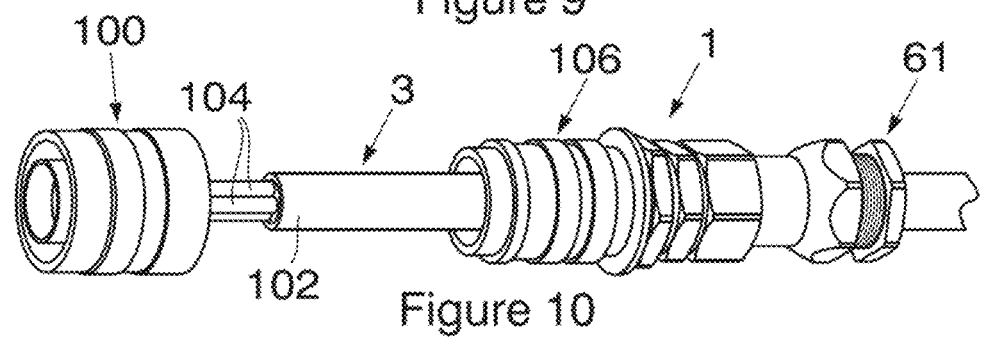

Referring to FIG. 10, the appropriate pins of the plug (100) are fitted to the prepared cores (104) and the pins are fitted into the appropriate positions in the plug.

Figure 11:
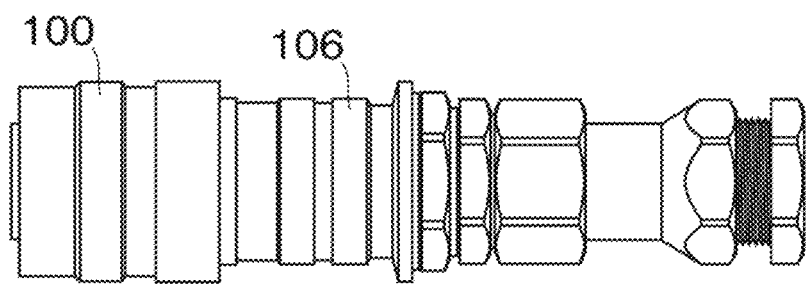

The assembled cable gland (1) is then slid down the cable (3) and re-assembled to the plug (100), as shown in FIG. 11.

Figure 12:
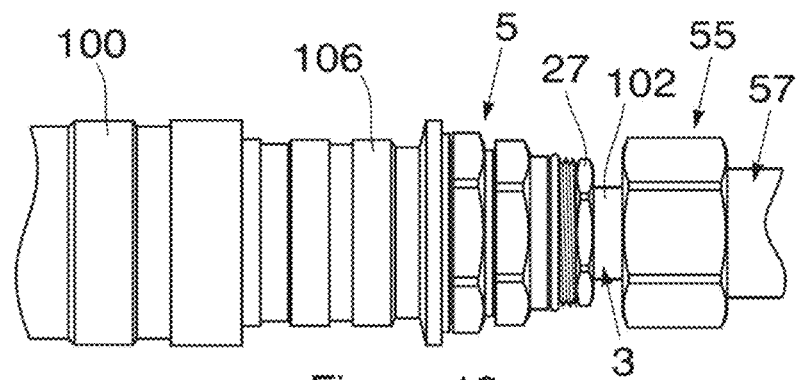

Next, the connector (55) is slackened to disconnect the clamping assembly (51) from the body (5) and the clamping assembly (51) then moved away to expose the outer sheath (102) of the cable (3), as shown in FIG. 12. Ensuring that the cable cores within the plug connector (100) are as straight as possible without being under tension, a mark (III) is made on the cable sheath (102) at the point that it leaves the body (5), adjacent the flange (27) of the locating member (11).

Figure 13:
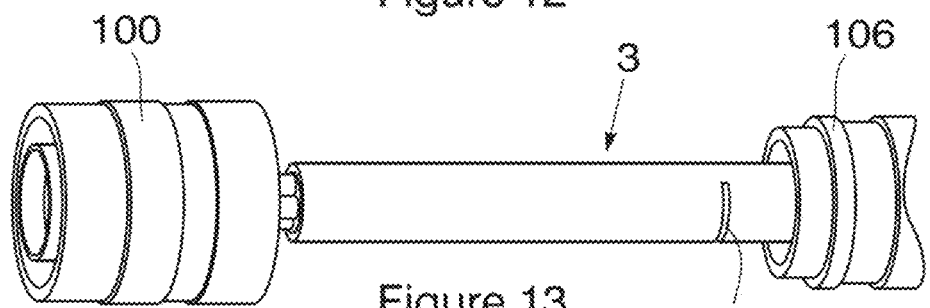

The plug (100) is then disconnected once more from the plug connector (106) and the cable gland (1) and connector (106) slid along the cable (3), far enough away from the plug (100) to expose the mark (111) on the cable (3), as shown in FIG. 13.

Figure 14:
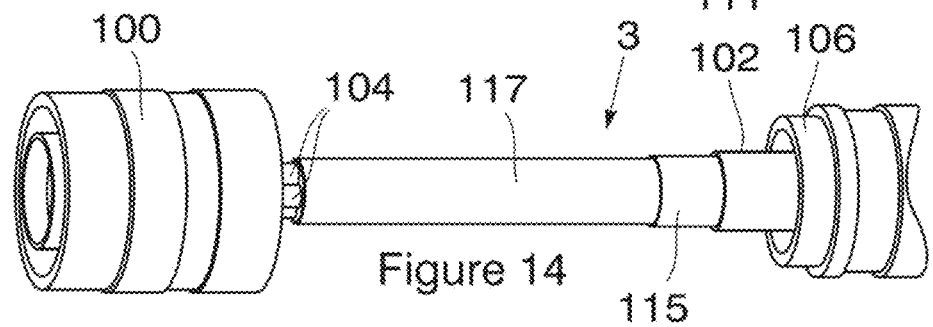

Referring to FIG. 14, the outer sheath (102) is then removed from the mark (111) to the plug (100) to expose the braid (115), or armour. The braid (115) is then trimmed back so that approximately 10 to 15 mm remains exposed from the mark (111), leaving the inner bedding (117) exposed.

Figure 15:
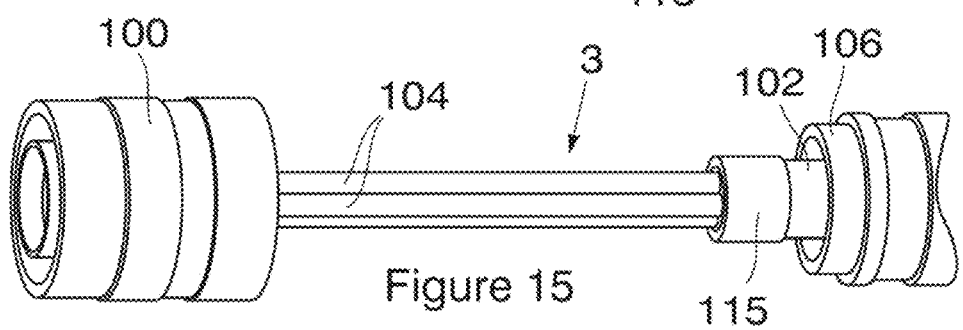

The braid (115) is then folded back over the outer sheath (102) and the inner bedding (117) and any tapes, foils and the like removed to expose the cable cores (104), as shown in FIG. 15.

Figure 16:
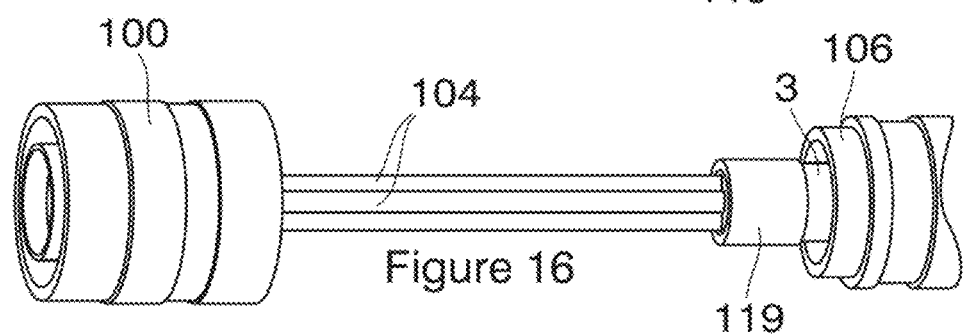

The braid (115) should be kept as close to the cable (3) as possible by wrapping electricians' tape (119), or similar, about it, as shown in FIG. 16.

Figure 17:
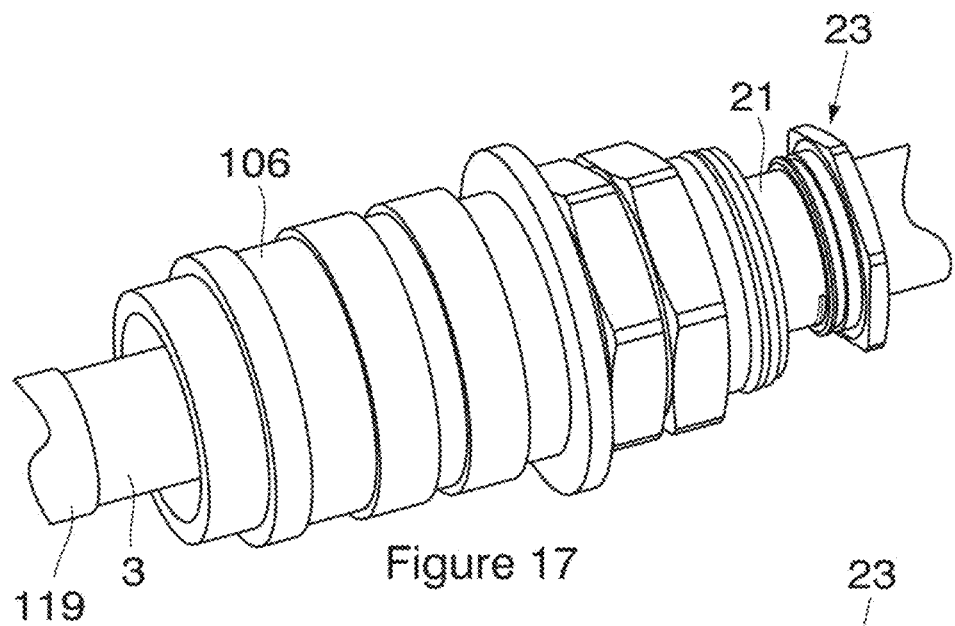
Figure 18:
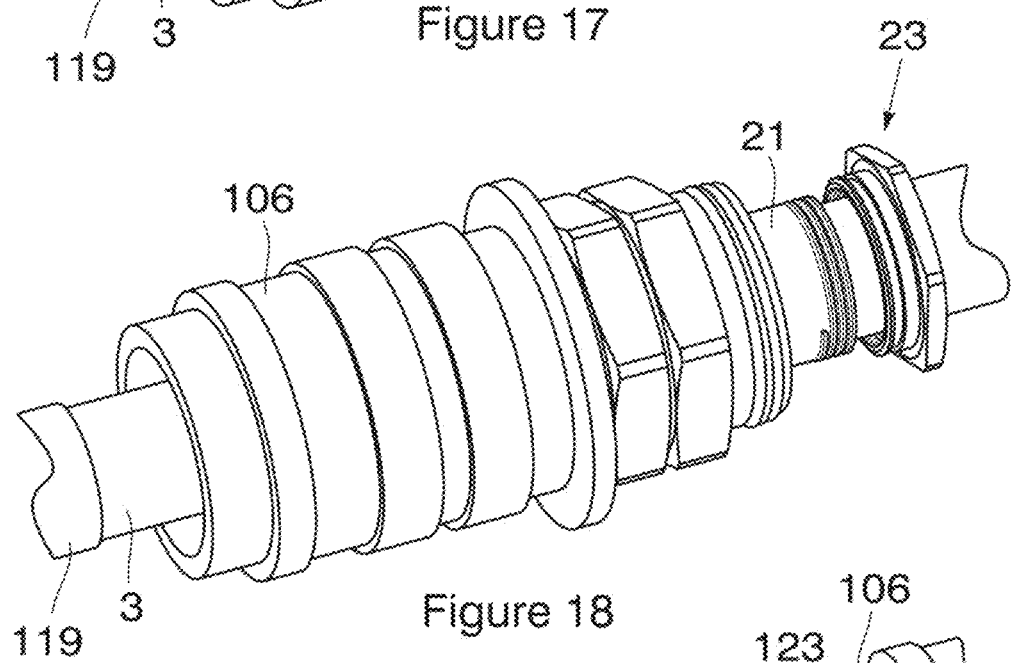

The locating member (23) with the sleeve (21) attached is then withdrawn from the passage (11) in the body (5), as shown in FIG. 17, and the locating member (23) removed from the sleeve (21), as shown in FIG. 18.

Figure 19:
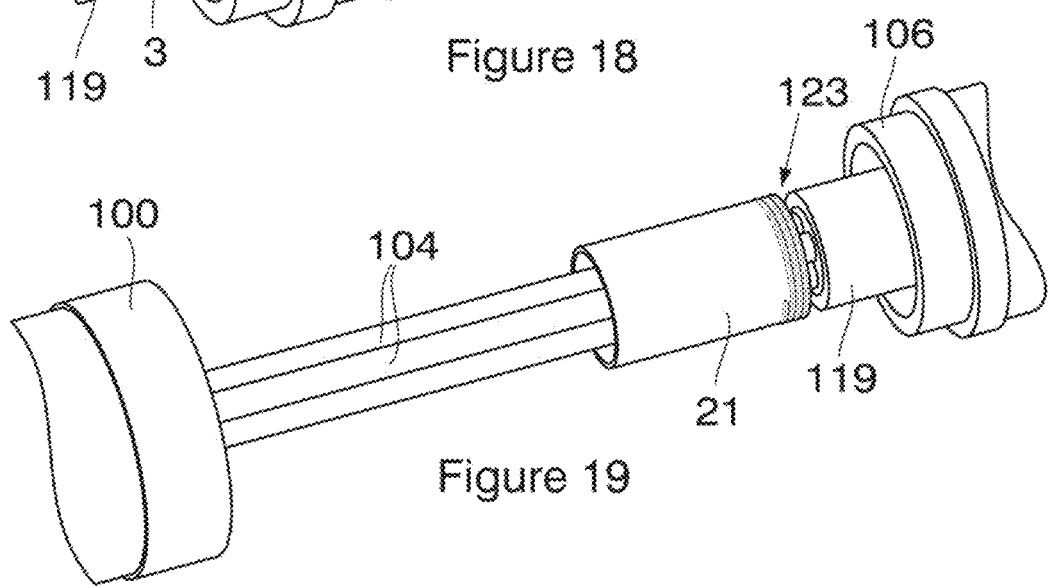

The sleeve (21) is then free to slide within the passage (11) and it is moved through the body (5) out of the connector end (9) and through the connector (106) and positioned over the cable cores (104), as shown in FIG. 19. A gap (123) of about 3 mm should be left between the threaded end of the sleeve (21) and the taped (119) end of the cable.

Figure 20:
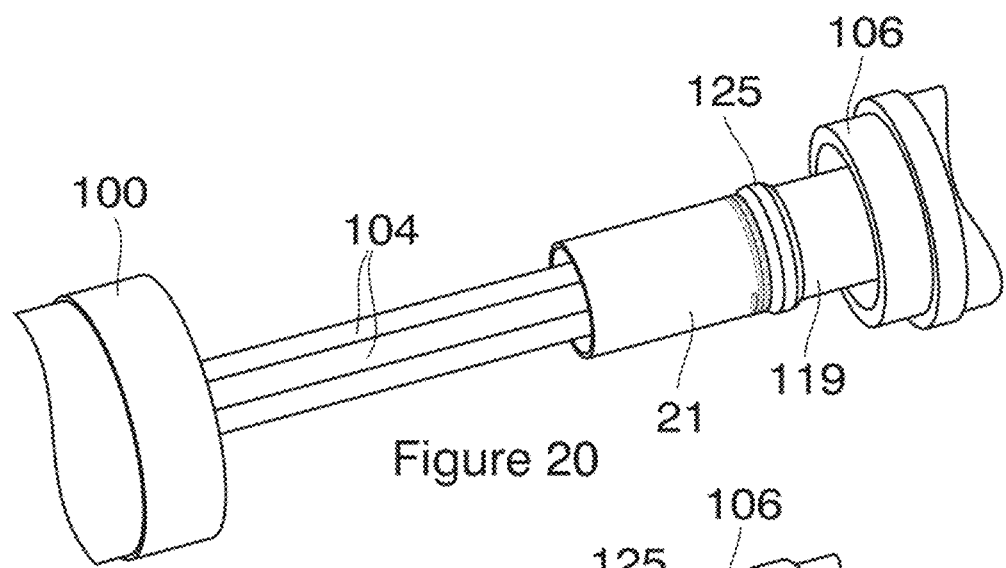

Holding the sleeve (21) in position, modelling clay (125), or similar, is packed around the threaded end of the sleeve (21) to seal it, as shown in FIG. 20.

Figure 21:
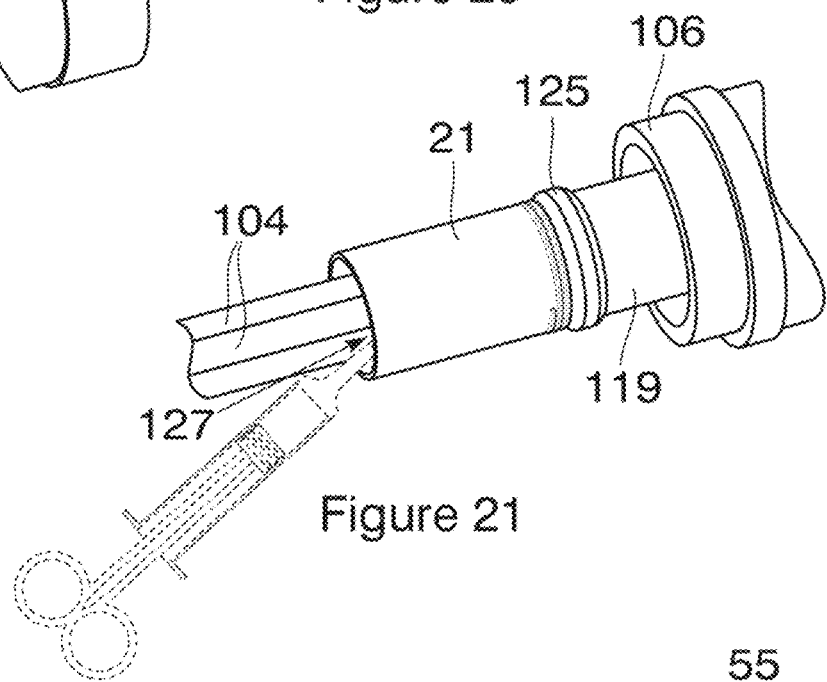

Referring to FIG. 21, the sleeve (21) is held upright, or vertical, with the clay (125) lowermost and a barrier resin injected into the sleeve (21) (indicated by arrow 127) to till it to about 5 mm below its top. The cores (104) should be gently wiggled or moved to release any trapped air and the sleeve (21) should then be filled to the top with resin. Any resin that gets onto the outside of the sleeve (21) should be wiped off.

The sleeve (21) is kept in the upright position until the resin cures. This should take a few minutes. Once the resin cures the modelling clay (125) is removed and any resin that may have leaked onto the threads (35) should be removed.

Figure 22:
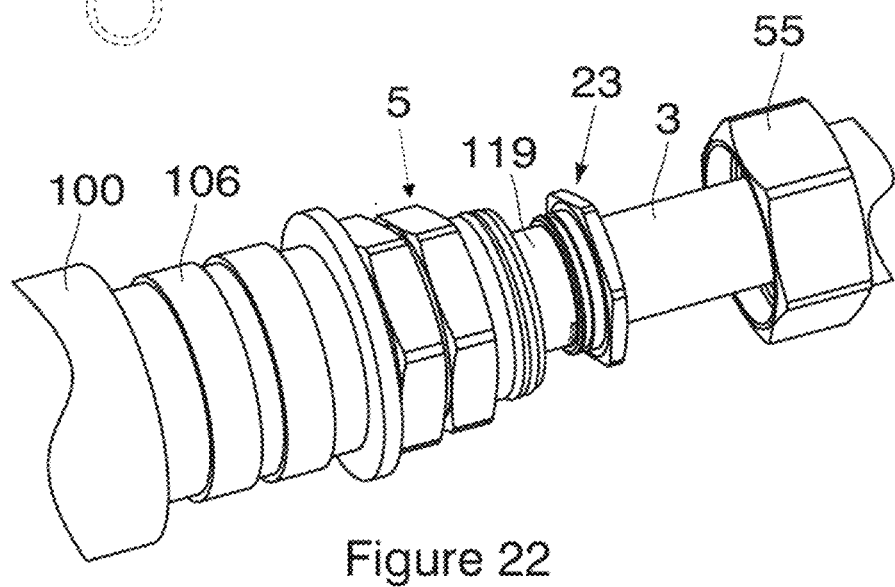

Referring to FIG. 22, the connector (106) and gland body are then slid down the cable (3) and repositioned over the sleeve (21).

Figure 23:
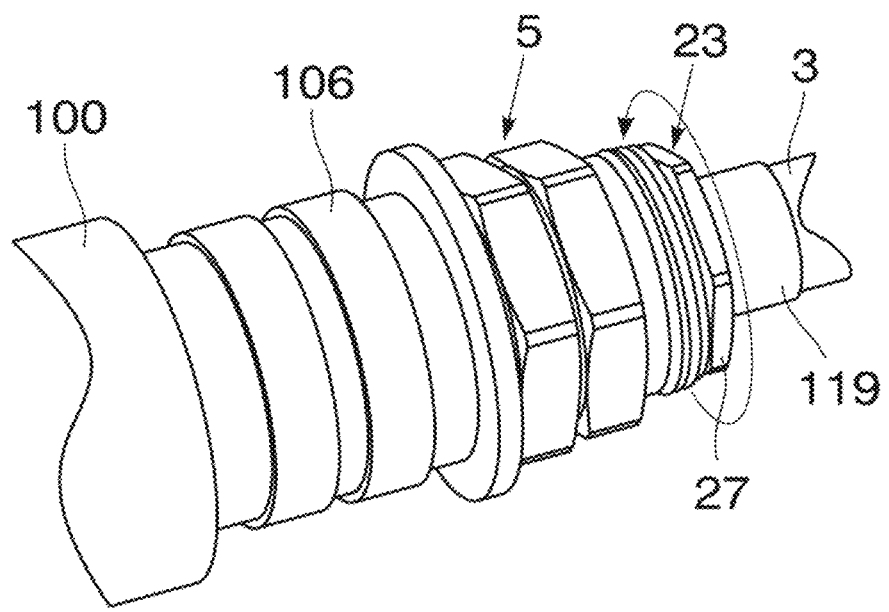

The sleeve (21) is then secured in the body (5) by screwing locating member (23) (finger tight) into place over the sleeve (21) until the flange (27) abuts the body (5), as shown in FIG. 23. It does not need to be tightened more than finger fight as to do so may strain the cores (104) within the body (5). Similarly, if it is not tightened until the flange (27) is against the body (5), then the cores (104) may be pushed into the plug (100) and so no longer be straight when the gland (1) is fully assembled. The screwed connection between the sleeve (21) and locating member (23) allows, in this embodiment, 2 or 3 mm tolerance in the position of the sleeve (21) on the cable (3).

Figure 24:
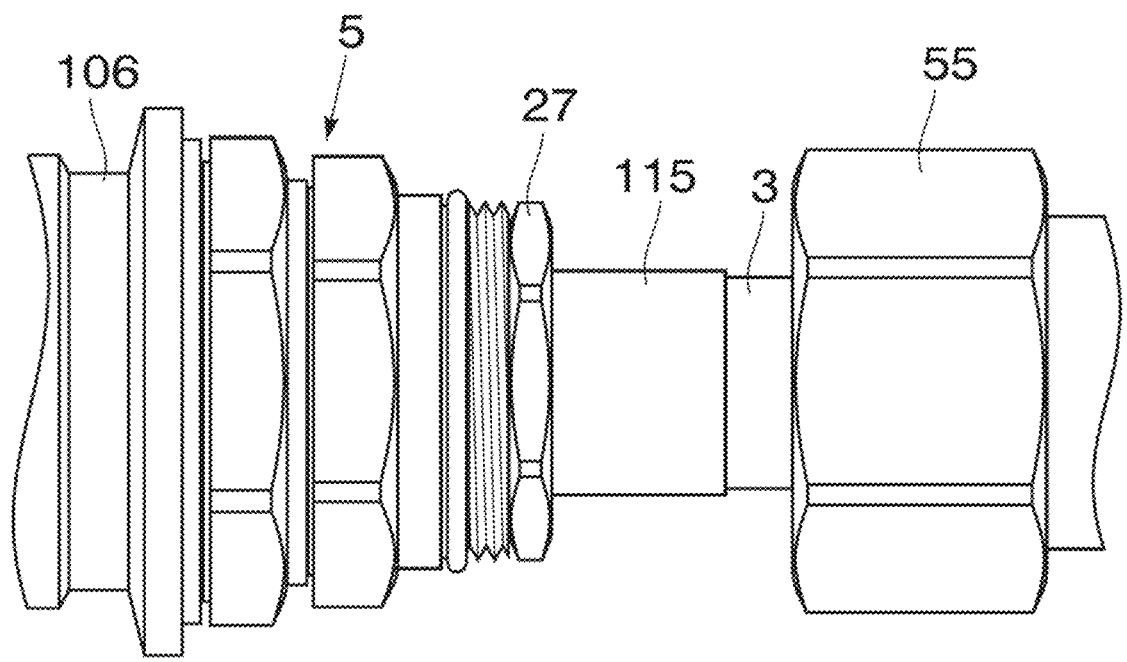

The tape (119) is then removed to expose the braid (115), as shown in FIG. 24.

Figure 25:
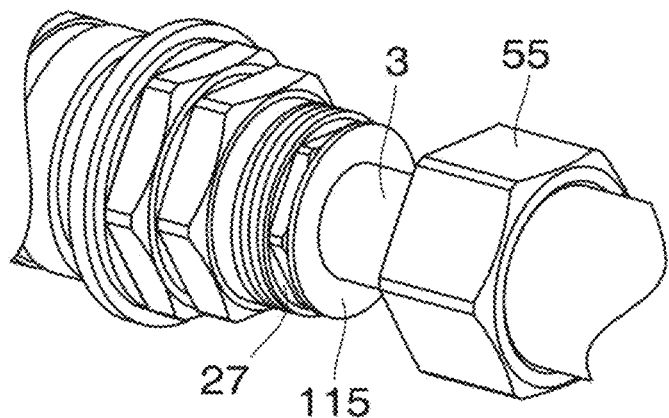

The braid (115) is next spread out evenly and pressed against the face of the flange (27) and trimmed so that it does not extend beyond periphery of the flange (27), as shown in FIG. 25.

Figure 26:
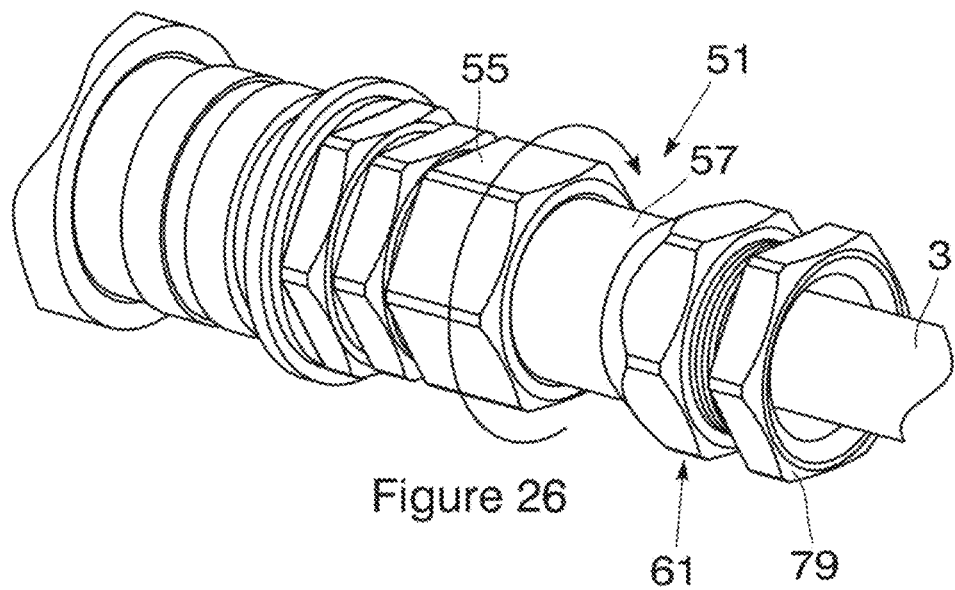

The clamping assembly (51) is then moved down the cable (3) until the clamping surface (71) at the clamping end (59) abuts the braid (115) on the flange (27), thus capturing the braid (115) between the flange (27) and a clamping surface (71). Holding the clamping assembly (51) with a spanner at the clamping end (61) of the tubular member (57) to prevent it rotating, the connector (55) is then screwed over the entry end (7) of the body (5) to secure the clamping assembly (51) to the body (5), as shown in FIG. 26. In so doing, the braid (115) is firmly clamped between the flange (27) and clamping surface (71).

As the flange (27) and clamping surface (71) extend normally to the cable (3), the armour, in this embodiment, the braid (115), is not drawn upwardly, away from the cable (3), or in a longitudinal direction, thus preventing longitudinal movement of the cable (3) during fastening. This in turn ensures that the cores (104) remain straight within the gland (1) and do not become either bent or stretched during assembly.

Figure 27:
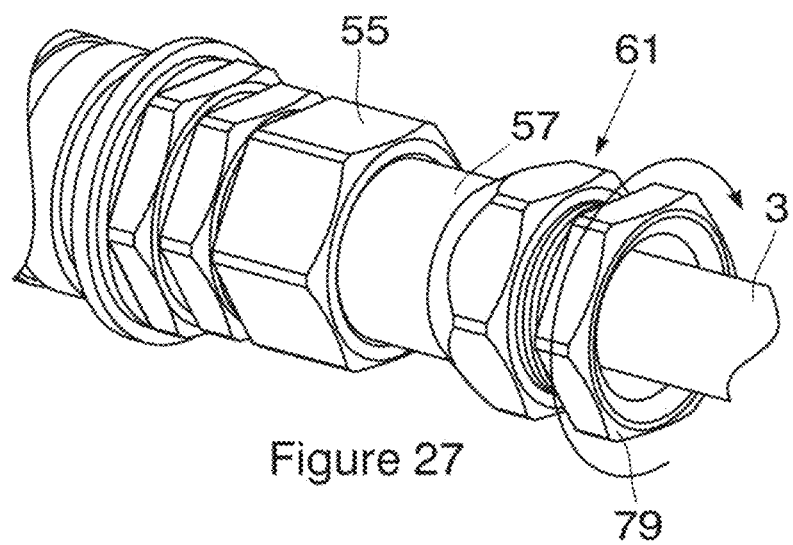

Finally, as shown in FIG. 27, while continuing to hold the tubular member (57) with the spanner, the nut (79) is tightened until the seal (77) makes contact with the cable (3), and then tightened by a further full turn. This ensures that the cable is fully secured and the ingress protection ("IP") rating of the cable gland (1) is maintained.

This completes installation of the cable gland (1) onto the armoured cable (3). The cable cores (104) are firmly secured by the resin within the sleeve, which is in turn secured within the body (5) by the locating member (27). This arrangement ensure that the cores cannot become bent or stretched during further assembly or fitting of the gland. Clamping of the armour ensures that it is firmly held in position with no longitudinal force being applied to the cable during fastening or loosening. The cable gland provides required IP ratings and the use of the resin about the cores in the sleeve further ensures that it can be used in hazardous gas environments.

An advantage provided by the cable gland (1) is that it can be assembled after the cable cores have been fitted to the equipment or fitting, which is a reversal of the normal assembly procedure. This may be achieved by having a number of features. First, the sleeve with the removable locating member allows the sleeve to pass through both ends of the gland body. Second, clamping of the cable armour allows the clamping to be removed when the cable gland is disassembled. While the clamp faces are preferably at 90° to the cable axis, other angles may also be used. The armour is conventionally clamped at a shallow angle to the cable axis, typically 10°. This is because it is preferable to have a clamping method that can be inspected after assembly and this is normally achieved using a cone and a ring with an internal tapered face. When these two are clamped together the ring will lock in place and remain there when the gland is disassembled. In the cable gland of the present application, it is important that no parts remain clamped to the cable when the gland is disassembled and this is another reason why a conventional, prior art, armour clamp cannot be used. Third, the essentially constant internal diameter through the length of the cable gland permits the entire gland to be inserted over the armoured cable and its component parts moved sequentially into place during fitting or assembly.

Although the cable gland is described for use with armoured cables, it will be appreciated that it may also be used with murmured cables.

While the cable gland is primarily shown and described in the embodiments with a sleeve, the cable gland does not require a sleeve. With the addition of a sleeve the gland may be capable of getting 'Ex d' certification but without the sleeve, the gland would likely only be able to obtain 'Ex e' certification. There are however numerous hazardous area applications where 'Ex e' certification would be sufficient, and the gland would therefore not require a sleeve to obtain 'Ex d' certification in such cases.

Therefore, another embodiment of the cable gland is provided that does not include a sleeve. The components exclusively needed to secure the sleeve in place may also be excluded from this embodiment. Without a sleeve, the addition of resin, epoxy or a similar settable material (as shown in FIG. 21) would consequently not be practical. The locating member may have a different configuration to what is shown in the embodiments but that still provides the face for the clamping surface to interact with. For example, the locating member and flange may be integrally formed on the body at the entrance end. The face and clamping surface may extend in a generally normal radial direction to the axes of the passage and bore. All other components and variations of the cable gland may still be used as described and shown.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the application is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A cable gland for an armoured cable, comprising:
   an elongate body having an entrance end and a fitting end with a passage extending between the entrance end and the fitting end configured to slide over the armoured cable;
   a locating member having a flange which operatively abuts the entrance end of the body; and
   a clamping assembly securable to the entrance end of the body through a coupler, the clamping assembly including a tubular member having a clamping end and a free end with a bore extending between the clamping end and the free end, the clamping end providing a clamping surface complementary to the flange of the locating member for securing cable armour between the clamping surface and the flange of the locating member;
   wherein the elongate body and the tubular member provide a constant internal diameter through the length of the cable gland configured to permit the cable gland to be placed over the armoured cable and moved along the armoured cable during assembly of the cable gland.

2. The cable gland according to claim 1, wherein a sleeve is slidably located in the passage and moveable through both ends of the elongate body and securable in the passage by the locating member.

3. The cable gland according to claim 2, wherein the locating member has an internally screw threaded portion which operatively engages an externally screw threaded portion on the sleeve.

4. The cable gland according to claim 2, wherein the passage is radially outwardly stepped at the entrance end to receive part of the locating member when secured to the sleeve.

5. The cable gland according to claim 2, wherein the internal diameter of the sleeve is substantially the same as that of the bore of the clamping assembly.

6. The cable gland according to claim 1, wherein the flange and the clamping surface extend in a substantially normal radial direction relative to the axes of the passage and the bore of the clamping assembly.

7. The cable gland according to claim 1, wherein a compression seal for sealing onto an outer sheath of a cable is provided at the free end of the tubular member.

8. The cable gland according to claim 7, wherein a nut is provided on the clamping assembly and is operable to compress an elastomeric member within the tubular member.

9. The cable gland according to claim 8, wherein the bore of the clamping assembly is diametrically enlarged at the sealing end to receive the elastomeric member in the bore of the clamping assembly.

10. The cable gland according to claim 1, wherein the coupler is carried on the tubular member.

11. The cable gland according to claim 10, wherein the coupler is screw threaded for securing to complementary external screw threading on the entrance end of the body and is shaped to fit over the flange of the locating member.

12. The cable gland according to claim 10, wherein the coupler is held captive on the tubular member by an elastomeric ring encircling the tubular member proximate to the clamping end.

13. The cable gland according to claim 1, wherein the flange of the locating member is of smaller diameter than an outer diameter of the entrance end of the body.

* * * * *